United States Patent [19]

Osborn

[11] 4,245,521
[45] Jan. 20, 1981

[54] MANUAL TRANSMISSION SHIFTER FOR OPERATING A TRANSMISSION WITH FLEXIBLE CABLES

[75] Inventor: Charles Osborn, Spring Lake, Mich.

[73] Assignee: Grand Haven Stamped Products Company, Grand Haven, Mich.

[21] Appl. No.: 905,123

[22] Filed: May 12, 1978

[51] Int. Cl.³ .................. G05G 9/16; F16H 57/06
[52] U.S. Cl. .................. 74/476; 74/473 R; 74/475
[58] Field of Search .................. 74/473 R, 475, 476

[56] References Cited

U.S. PATENT DOCUMENTS

| | | | |
|---|---|---|---|
| 1,630,076 | 5/1927 | Schmidt . | |
| 1,762,172 | 6/1930 | Gyllin . | |
| 1,820,501 | 8/1931 | Schmidt . | |
| 1,888,728 | 11/1932 | Johnson . | |
| 1,897,216 | 2/1933 | Schmidt . | |
| 1,970,690 | 8/1934 | Churchill | 74/473 |
| 2,191,543 | 2/1940 | Osborne | 74/473 |
| 2,245,714 | 6/1941 | Price et al. | 74/473 |
| 2,250,820 | 7/1941 | Backus | 74/473 |
| 2,269,970 | 1/1942 | Bundy et al. | 74/476 X |
| 2,481,465 | 9/1949 | Auten | 74/473 |
| 2,489,735 | 11/1949 | Zancan | 74/473 SW X |
| 2,503,893 | 4/1950 | Wahlberg | 74/473 |
| 2,504,285 | 4/1950 | Wahlberg et al. | 74/473 |
| 2,926,762 | 3/1960 | Edgley | 192/4 |
| 3,010,337 | 11/1961 | Madsen et al. | 74/473 |
| 3,016,758 | 1/1962 | Keller | 74/473 |
| 3,600,966 | 8/1971 | Anderson | 74/473 SW |
| 3,628,395 | 12/1971 | Maurer | 74/473 R |
| 3,808,907 | 5/1974 | Yamaguchi | 74/473 R |
| 3,818,779 | 6/1974 | Skelley | 74/473 R |
| 4,143,560 | 3/1979 | Kinkade | 74/476 X |

FOREIGN PATENT DOCUMENTS

| | | | |
|---|---|---|---|
| 807123 | 10/1936 | France | 74/473 R |
| 946867 | 12/1948 | France | 74/473 R |
| 2256466 | 12/1973 | France | 74/473 R |
| 964188 | 7/1964 | United Kingdom | 74/473 SW |

Primary Examiner—Allan D. Herrmann
Attorney, Agent, or Firm—Price, Heneveld, Huizenga & Cooper

[57] ABSTRACT

A transmission shifter for vehicles, the shifter being of the type for transmitting gear shift movements to a transmission through a pair of flexible shielded cables. The shifter comprises a shift lever which is pivotable about mutually orthogonal axes. Pivotal movement of the shifter about one axis is translated into a linear displacement of one of the flexible shielded cables. Pivotal movement of the shifter about the other axis is translated into a linear displacement of the other flexible shielded cable. A push button actuated lockout means is provided for locking out the reverse position.

50 Claims, 17 Drawing Figures

MANUAL TRANSMISSION SHIFTER FOR OPERATING A TRANSMISSION WITH FLEXIBLE CABLES

BACKGROUND OF THE INVENTION

The present invention relates generally to manual transmission shifters. More particularly, the invention relates to a floor mounted shifter of the type transmitting gear shift lever movements to transmission shift linkage with a pair of flexible shielded cables.

Flexible, shielded cables for transmitting push and pull forces are known in the prior art as Bowden cables. Gear shifting arrangements are found in the prior art employing one or more of these types of flexible cables as well as unshielded cables to interconnect a gear selector shifter and transmission shift linkage. Broadly, these prior art shifters may be categorized by the number and type of flexible cables employed and by the placement of the gear select lever. Prior art gear shifting arrangements employing flexible cables include shifters employing unshielded cables, shifters employing a single shielded cable with a shifter steering wheel or dashboard mounted and shifters employing two shielded cables with the shifters, steering wheel, dashboard, or floor mounted.

Those shifters employing unshielded cables suffer from several immediate disadvantages, the most obvious being that unshielded cables are capable of only transmitting forces under tension and buckle when placed under compression. Thus, these cables can transmit pulls but not pushes. Furthermore, a plurality of pulleys or the like must be provided to enable these cables to traverse an arcuate path. Shifters employing a single shielded cable, by they steering wheel mounted, or dashboard mounted shifters, suffer from the disadvantage that they either cannot employ the conventional "H" pattern shifting arrangement or they must employ at least one conventional shifting rod in combination with the cable. This one shifting rod will then suffer from the inherent disadvantages that rigid shifting linkages present in an application where the shifter is remote from the transmission.

Prior art shifters employing two shielded cables, be they shifters, steering wheel, dashboard or floor mounted, have either abandoned the conventional "H" pattern shifting arrangement or have resulted in shifting mechanisms that are relatively complex, expensive and which have a very poor feel. This lack of feel makes it difficult for the driver to determine when he has properly engaged the desired gear. Also, the prior art has never considered or solved the problems associated with employing such a two cable, floor mounted shifter to remotely control a four speed transmission in a modern automotive sedan having front wheel drive.

Furthermore, prior art shifters employing one or more flexible cables are not found featuring a reverse lockout, and particularly a push button actuated reverse lockout. A reverse lockout is a desirable feature on automotive transmission shifters that prevents accidental entry into the reverse position that could seriously damage the transmission.

SUMMARY OF THE INVENTION

These and other problems in the prior art are solved by provision of a manual transmission shifter comprising a gear selecting shift lever, a rotatable shift lever carrier, and a stationary base for mounting the transmission shifter to an automotive vehicle. Gear selection is accomplished by pivoting of the shift lever about first and second generally orthogonal axes. Pivoting of the shift lever about the first axis is accommodated by provision of a shift lever journaled in and pivotable relative to the carrier. Pivoting of the shift lever about the second axis is accommodated by provision of a carrier journaled in and pivotable relative to the base and the second axis. The shifter further includes means for translating rotation of the shift lever about the first axis and means for translating rotation of the shift lever and carrier about the second axis into cable displacements. This relatively simple arrangement for providing a shift lever pivotable about first and second orthogonal axes provides for simplified assembly, cost reduction and reliability in a compact "H" pattern cable operating shifter having a solid mechanical feel. The shifter provides for the remote control of a manual transmission allowing the placement of the shifter in any desired position with reference to the vehicle frame, engine or transmission. The mechanical operation of the shifter is also impervious to flexing of the vehicle body frame or twisting thereof due to an accident.

In more narrow aspects of the invention, the cost of the shifter is further reduced by a shifter design employing stamped and bent metal parts for the major structural members of the shifter. The mechanical feel of the shifter is further improved by spring detent means comprising an undulating spring mounted on the carrier and a spring follower mounted on the shift lever. The spring includes depressions corresponding with shift lever positions that are fully in gear, and the spring urges the follower into these depressions. Feel is further improved by solid mechanical stops. A push button reverse lockout is provided on the top of the shift lever handle to provide a convenient means for preventing accidental placement of the transmission in the reverse position. Furthermore, means are provided for accommodating incoming cables at angles incident to the first and second orthogonal axes without bending of the cables in a manner that shortens cable life and causes cable binding. This last feature is particularly important in the application of the shifter to a front wheel drive automotive sedan requiring a floor mounted shifter.

DESCRIPTION OF THE PREFERRED EMBODIMENTS

Figure 1:
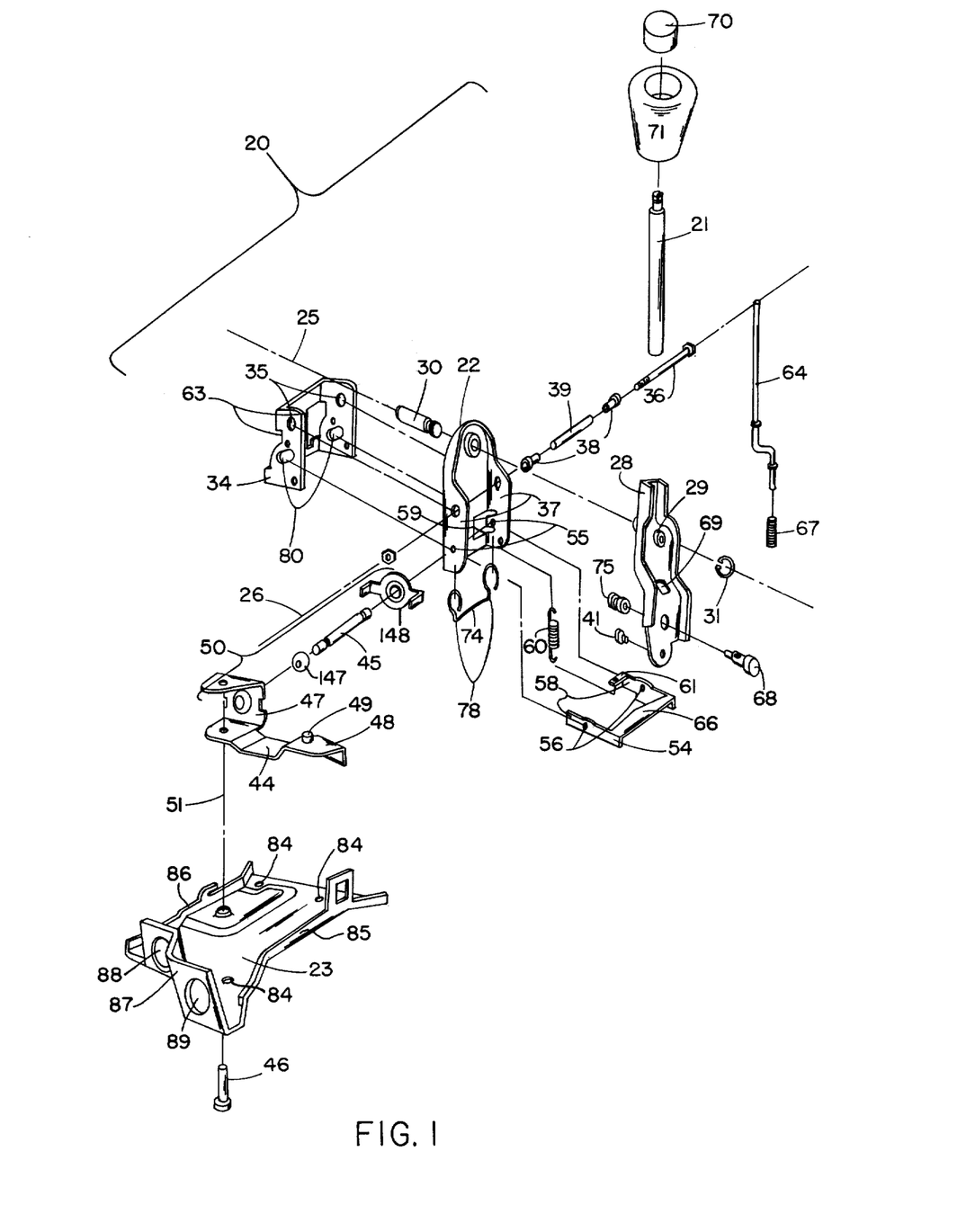
FIG. 1 is an exploded assembly of a shifter constructed according to the present invention.

Referring to FIG. 1, an exploded assembly of a shifter 20 constructed according to the present invention is illustrated. The shifter 20 comprises a gear selecting shift lever 21 (further illustrated in FIGS. 11 and 13), a rotatable shift lever carrier 22 (further illustrated in FIGS. 5-7), and a stationary base 23 (further illustrated in FIGS. 2-4) for mounting the transmission shifter 20 to an automotive vehicle. The shift lever 21 can duplicate the conventional "H" pattern by pivoting about first and second generally orthogonal axes 25 and 26, respectively. Pivoting of the shift lever 21 about the first axis 25, along the sides of the "H" pattern, is achieved by journaling or pivoting the shift lever 21 relative to the carrier 22. The shift lever 21 is journaled in the carrier 22 by securing the shift lever 21 to handle bracket 28, including a tube 29 clinched in the handle bracket 28 along the first axis 25. The handle bracket 28 is then pinned to carrier 22 by insertion of a pin 30 through carrier 22 and handle bracket 28, the pin 30 being welded or otherwise suitably secured to the handle bracket 22. A circlip 31 or the like secures the handle bracket 28 to the pin 30 and carrier 22.

Pivoting of the shift lever 21 about the second axis 26, between the sides of the "H" pattern, is provided by journaling the carrier 22 in base 23. The base 23 includes an upwardly extending tower 34 firmly secured thereto. The tower 34 includes apertures 35 disposed along the second axis 26. The carrier 22 fits within tower 34 and is pinned thereto by bolt 36 extending through apertures 35 and a bearing assembly mounted in opposing flanges 37 of carrier 22, including bearing inserts 38 and spacer 39.

Means for translating rotation of the shift lever 21 about the first axis 25 into a cable displacement comprises a weld pin 41, or equivalent means for pivotally securing the cable, secured to the handle bracket 21 at a point below the first axis 25. A first shielded cable is pinned thereto to transmit movements of the shift lever 21 about the first axis 25 to the transmission. Means for translating rotation of the shift lever 21 and the carrier 22 about the second axis 26 to a cable displacement (best illustrated in FIGS. 11, 12 and 14) comprises a bell crank 44 and drive pin 45 mounted in carrier 22. The bell crank 44 is pivotable about the base 23 on an upstanding weld pin 46. The drive pin 45 interconnects the carrier 22 at a point below the second axis 26 to one end 47 of bell crank 44. The opposite end 48 of bell crank 44 includes a weld pin 49, or equivalent means for pivotally securing a second flexible shielded cable.

The shifter 20 includes means for accommodating the flexible shielded cables at angles incident to the first and second orthogonal axes 25 and 26 without bending of the cables in a manner that shortens cable life or causes binding of the cables. This is particularly important in applications where the shifter is floor mounted in a modern front wheel drive sedan. Such sedans are usually supplied with bucket seats with the shifter mounted therebetween and inclined backward. Often the incoming cables from the transmission intercept the shifter at an incident angle that shortens cable life or impairs smooth cable operation. The means for accommodating flexible shielded cables at incident angles comprises a ball and socket connection 50 between drive pin 45 and end 47 of bell crank 44. The ball and socket connection illustrated in FIG. 1 is illustrated in further detail in FIG. 12. The ball and socket connection 50 includes a ball 147 disposed on the end of drive pin 45. A washer-like member 149 retains the ball 147 in a pocket in the bell crank 44. The ball and socket connection 50 allows the pin 46, about which bell crank 44 pivots to be disposed along an axis 51 which is canted rather than orthogonal to first and second axes 25 and 26. This allows pin 49 to be accurately aligned with the incoming cables. However, the ball and socket connection 50 is preferred even if axis 51 is not canted relative to axes 25 and 26 since this is the best method to hold lash or lost motion in the shifter to a minimum. Pin 41 of handle bracket 28, which is connected to the first incoming cable, requires no such provision since the first cable is pivotally mounted on pin 41 and the bracket 28 upon which pin 41 is mounted can be deformed to match the incoming angle of the first cable.

The shifter further includes lockout means for locking the shift lever out of the reverse position. The lockout means comprises a pawl 54 pivotally mounted in carrier 22 about drive pin 45, (best illustrated in FIGS. 6, 7 and 9). Drive pin 45 extends through apertures 55 in carrier 22 and apertures 56 in pawl 54 to pin pawl 54 to the carrier 22. The pawl 54 prevents rotation of the shift lever 21 and carrier 22 about the second axis 26, which is necessary for entering the reverse gear position, by providing interference between the leading edges 58 of pawl 54 and the walls of the tower 34. The leading edges 58 extend through apertures 59 in the carrier 22. The pawl 54 is spring biased downwardly to a position for engagement with the walls of tower 34 of base 23 by a spring 60 interconnected between tab 61 on pawl 54 and the carrier 22. The tower 34 of base 23 includes apertures such as the ones illustrated at 63 through which the leading edges 58 of pawl 54 can be moved when the pawl 54 is pivotally engaged by push rod 64. The push rod 64 which engages a platform 66 on pawl 54 is spring biased in a generally upward direction by compression spring 67 and extends through a weld pin 68, an aperture 69 in handle bracket 28, and tubular shift lever 21. The push rod spring biases upwardly a push button 70 disposed in a handle 71 on the top of tubular shift lever 21. Depression of the push button 70 moves upwardly biased push rod 64 down, engaging platform 66 of pawl 54 and pivoting the leading edges 58 of pawl 54 out of engagement with the walls of tower 34 of base 23. When the leading edges 58 of pawl 54 register with the apertures 63 in tower 34 pivoting of the shift lever 21 and carrier 22 about the second orthogonal axis 26 is provided for in a manner that allows entry to the reverse gear position.

Figure 8:
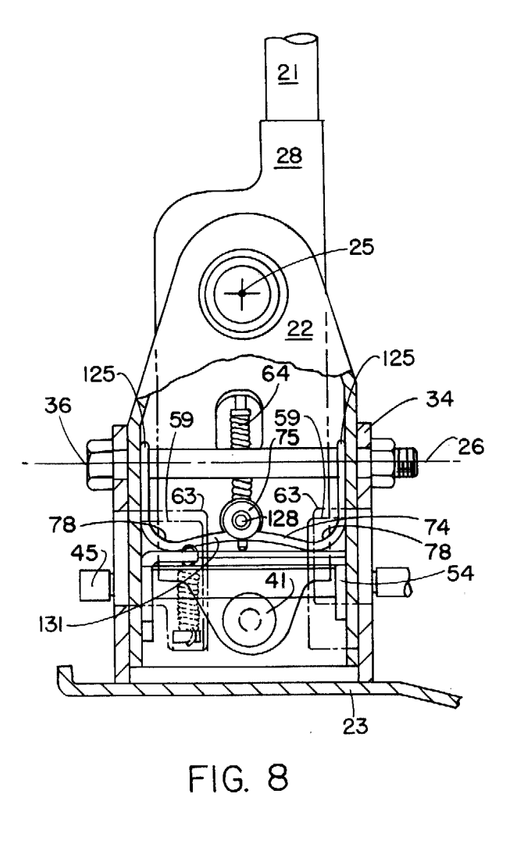
FIG. 8 is a side view, partially in section, of the shifter of the present invention.
Figures 9, 10:
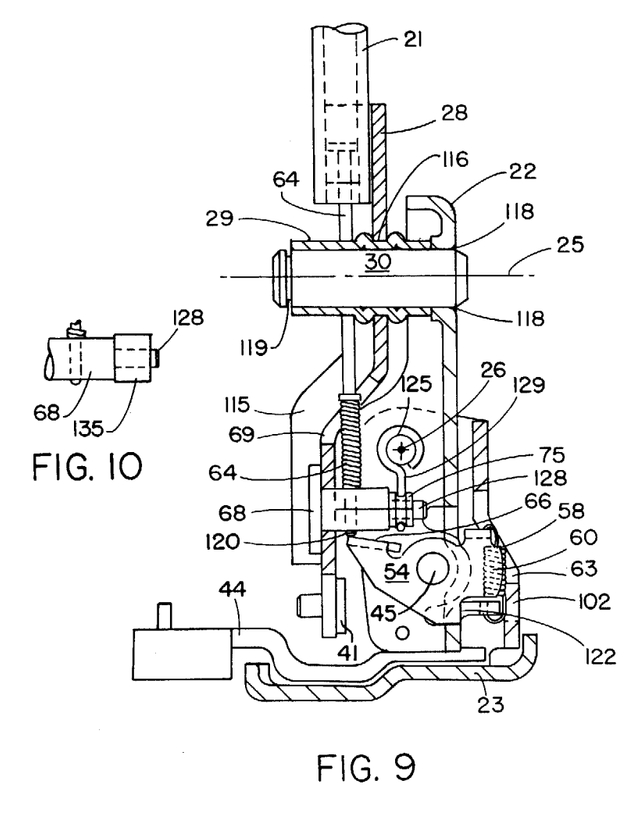
FIG. 9 is a rear end view, partially in section, of the shifter of the present invention.
FIG. 10 is a plane view of a rubber stop means employed in one embodiment of the invention.

The shifter 20 further includes spring detent means for improving the feel of the shifter and preventing rattles (best illustrated in FIGS. 8 and 9). The spring detent means comprises an undulating spring 74 which is pinned to carrier 22 by bolt 36. A grooved detent roller 75 disposed on handle bracket 28 on weld pin 68 follows the undulating spring 54 upon rotation of the shift lever 21 about the first axis 25. The undulating spring 74 includes depressions at 78 for accommodating the roller 75 when the shift lever 21 is in a fully engaged gear position.

The simplicity, ease in assembly, cost reduction, and reliability of the design is facilitated at least in part by multi-function part design. For example, the drive pin 45 in addition to transmitting rotation of the carrier 22 about second axis 26 to bell crank 44 acts as a shaft for journaling of pivotable pawl 54. Furthermore, drive pin 45 extends through arcuate slots 80 of the tower 34 of base 23. Interference between the drive pin 45 and the ends of the slot 80 provides positive stops defining the limits of travel of shift lever 21 and carrier 22 about the second axis 26. The positive stops thereby provided serve to further improve the mechanical feel of the shifter.

Figure 2:
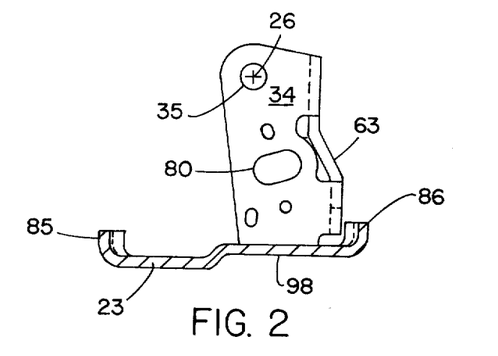
FIG. 2 is an end view, partially in section, of the base structure of the shifter of the present invention.
Figure 3:
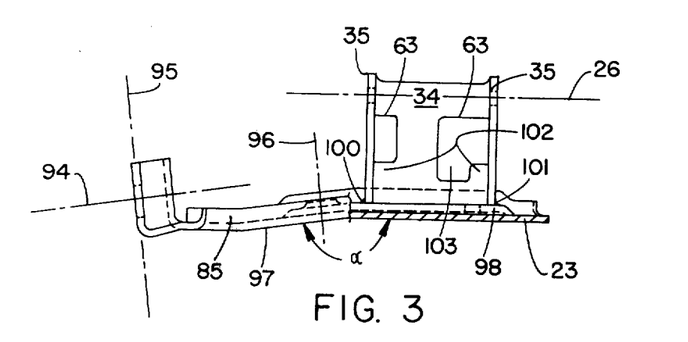
FIG. 3 is a side view, partially in section, of the base structure of the shifter of the present invention.
Figure 4:
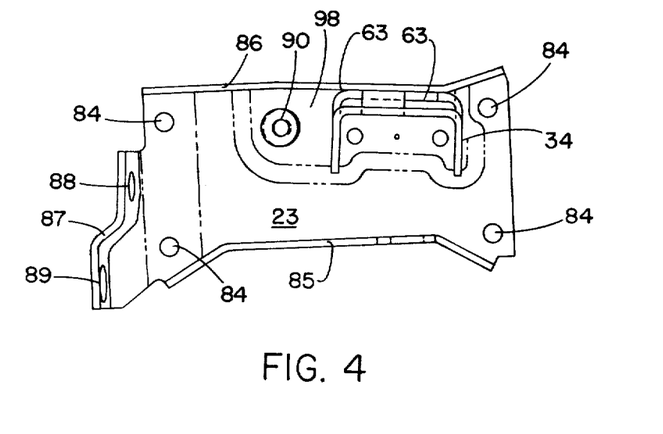
FIG. 4 is a top view of the base structure of the shifter of the present invention.

Referring now to FIGS. 2, 3, and 4, further details of the base structure of the shifter are illustrated. The base structure comprises a generally planar base plate 23 including an upstanding tower 34 firmly secured thereto. Both the base 23 and the tower 34 are of stamped metal construction to reduce cost. Stamped metal construction as used herein defines a type of construction wherein metal parts are substantially formed and cut to the desired shape with perhaps only one or two bending operations remaining, by the action of a pair of opposed stamping dies. The base plate 23 includes means for securing the shifter to an automotive vehicle body herein comprising a plurality of apertures 84 for bolting the shifter to a structural member of an automotive body. The base plate 23 includes flanges 85 and 86 disposed about its periphery and formed integrally therewith for strengthening the base plate 23. A flange 87 disposed on the front of the base plate 23 and formed integrally therewith is provided with apertures 88 and 89 for securing the shields of first and second shielded cables thereto. The flange 87 is disposed approximately orthogonal to the incident angle of the incoming cables. Weld pin 46, illustrated in FIG. 1, is inserted through aperture 90 in base plate 23 and is welded thereto on the bottom of the base plate 23. The pin 46 is also disposed at an angle canted with respect to the first and second orthogonal axes and generally orthogonal to the incident angle of the incoming cables.

Referring now specifically to FIG. 3, the incoming cables are centered on axis 94 canted with respect to the second orthogonal axis 26. As illustrated by centerlines 95 and 96, the flange 87 and the central axis of the pin 46, not shown in FIG. 3, are generally orthogonal to the line 94 representing the incoming angle of the first and second cables. Canting of the flange 87 and the pin 46 as indicated by lines 95 and 96 is accomplished by forming an extended front end portion 98 disposed at an angle with respect to the main portion of the base plate 23.

The base plate 23 further includes a raised portion 98 formed integrally therewith. The raised portion 98 provides an indentation for receiving the head of weld pin 46 flush to the bottom of base plate 23. In addition the raised portion 98 adds to the stiffness of the base particularly around the weld pin area. The raised portion further provides a platform for the mounting of tower 34. Tower 34, also a stamped metal part, is welded to the base plate 23 at 100 and 101. The tower 34 includes apertures at 35 centered on second orthogonal axis 26 about which the carrier 22 and shift lever 21 pivot. Arcuate slots 80 receive the ends of drive pin 45 of carrier 22 to define the limits of travel of the carrier 22 and shift lever 21 about the second orthogonal axis 26. The tower 34 also includes apertures 63 through which the leading edges of the reverse lockout pawl extend when the push button is depressed, pivoting the pawl out of engagement with the walls of the tower. Normally the leading edges of the pawl engage the walls of the tower at a point just below the aperture 63, generally indicated by the numeral 102. One of the apertures 63 includes a window 103 through which spring biasing means for the reverse lockout pawl normally extend.

Figure 5:
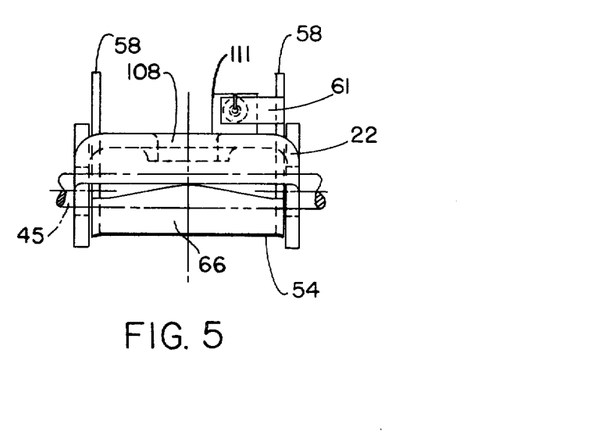
FIG. 5 is a top view of a carrier and pawl sub-assembly forming a part of the present invention.
Figure 6:
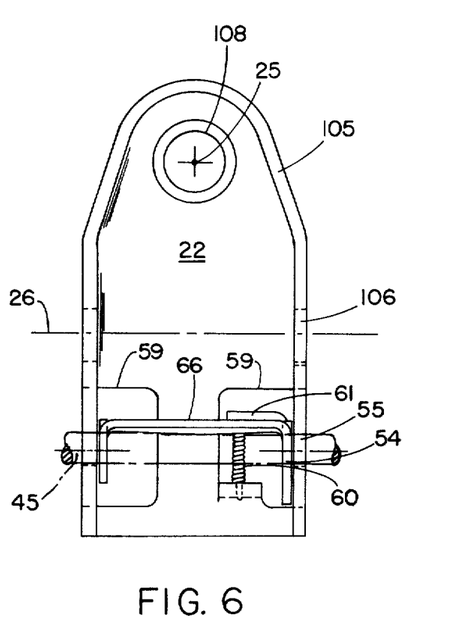
FIG. 6 is a side view of the carrier and pawl sub-assembly forming a part of the invention.
Figure 7:
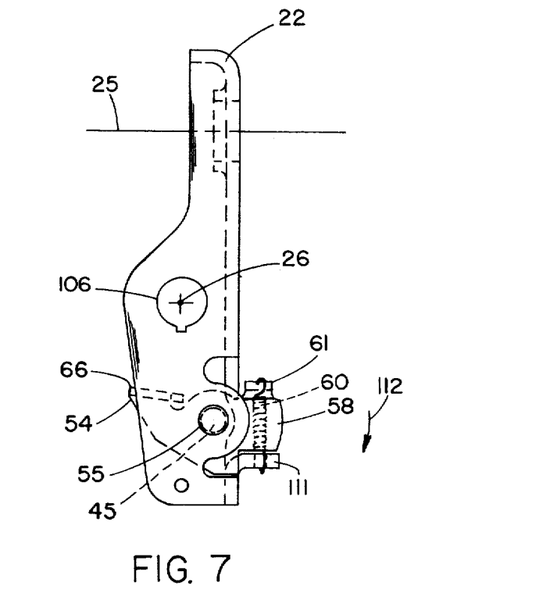
FIG. 7 is a side view of the carrier and pawl sub-assembly.

Referring now to FIGS. 5 through 7, further details of the carrier 22 and reverse lockout pawl 54 are illustrated. The carrier 22 is also a stamped metal part and includes a flange 105 extending about its periphery and formed integrally therewith for both strengthening the carrier 22 and providing pairs of apertures at 106 and 55. The apertures 106 are aligned along the second orthogonal axis 26 and receive a bearing assembly about which the carrier 22 normally pivots. The apertures 55 receive the drive pin about which pawl 54 is journaled. The carrier 22 further includes an aperture 108 centered on the first orthogonal axis 25. The aperture 108 receives a weld pin about which the handle bracket is pinned and shift lever is pivotable.

FIGS. 5–7 also illustrate in further detail the pawl 54 which is pivotable about the drive pin inserted in apertures 55. The pawl 54 includes leading edges 58 which normally engage the walls of the tower of the base structure. The pawl 54 includes a tab 61 for connection to a tension spring 60. The tension spring 60 interconnects the tab 61 with a tab 111 disposed below the tab 61 on carrier 22. The placement of tension spring 60 with respect to the drive pin disposed in apertures 55 spring biases the leading edges 58 of the pawl 54 to the position illustrated in FIG. 7, downwardly in the direction generally indicated by arrow 112. When the lockout push button on the top of the shift lever is depressed, a spring biased push rod engages platform 66 of pawl 54 to pivot the pawl 54 upward in a direction opposite the arrow 112 to register the leading edges 58 of the pawl 54 with apertures in the tower of the base structure. With interference between the pawl 54 and the tower of the base structure removed by registering the leading edges of the pawl 58 with apertures in the tower, the carrier 22 is then free to pivot about the second orthogonal axis 26 to place the shift lever in the reverse position.

Referring now to FIGS. 8 and 9, details of the assembly of tower 34, carrier 22, handle bracket 28, and shift lever 21 are illustrated. Handle bracket 28 is a stamped metal part including a flange 115 disposed about its periphery, both for strengthening the handle bracket 28 and receiving the shift lever 21 which is welded thereto. The handle bracket 28 further includes an aperture 116 centered on the first orthogonal axis 25 in which a tube 29 is clinched. A weld pin 30 is then inserted through aperture 108 in carrier 22, and clinched tube 29 to pin the shift lever 21 and handle bracket 28 about the first orthogonal axis 25. The weld pin 30 is then welded to the carrier 22 at 118. The opposite end of the pin 30 includes a circumferential groove 119 for receiving a circlip, or the like, which secures the handle bracket 28 and shift lever 21 to the pin 30.

The push rod 64 is slidably received in tubular shift lever 21, is curved around clinched tube 29 and is extended through aperture 69 in handle bracket 28. A compression spring 67 spring biases the push rod 64 in an upward direction. The bottom end 120 of the push rod 64 is seated in a bore extending through weld pin 68. The bottom end 120 of push rod 64 extends below weld pin 68 engaging platform 66 of pawl 54 when the push button atop tube 21 is depressed, compressing spring 64. Normally the leading edges 58 of pawl 54 engage the walls of tower 34 at point 102. However, engagement of the platform 66 by push rod 64 pivots the pawl 54 upward and places the leading edges 58 of the pawl 54 in aperture 63. This allows the carrier 22 and shift lever 21 to be rotated about the second orthogonal axis 26 to move the shift lever to the reverse position. Rotation about the second axis 26 may then continue until interference between the end of arcuate slot 80 and drive pin 45 forms a second stop. A face 122 prevents the spring 60 from pulling the pawl 54 too far. In FIG. 8, the carrier 22 and the tower 34 are cut away and partially shown in phantom. The phantom lines illustrate that the apertures 63 in tower 34 register with apertures 59 in carrier 22.

FIGS. 8 and 9 also illustrate further detail of the spring detent means for improving the feel of the shifter. The spring detent means comprises an undulating leaf spring 74, including a pair of eyes 125 for pinning the spring 74 to carrier 22 with bolt 36. The spring detent means further includes a plastic roller 75 journaled on a post 128 extending from pin 68, welded to handle bracket 28. The roller 75 includes a circumferential groove 129 in which the spring 74 is received. The spring 74 further includes depressions 78 in which the roller 75 is registered when shift lever 21 is in a fully in gear position. When between gears, the roller 75 rides on a high portion 131 of undulating spring 74, slightly compressing the undulating spring 74 in a manner similar to a leaf spring. Once the roller 75 leaves the center position illustrated in FIG. 8 by rotation of the handle bracket 28, either clockwise or counter-clockwise about first axis 25, the stored energy in undulating spring 74 will be released, tending to accelerate the movement of roller 75 into one of the depressions 78. Upon reaching one of the depressions 78, the roller 75 prevents metal to metal contact between handle bracket 28 and carrier 22. Thus the limits of travel of shift lever 21 and handle bracket 28 about first axis 25 are defined by a plastic/metal interface that further improves feel of the shifter.

Referring briefly to FIG. 10, in an alternate embodiment of the invention, spring detent means may be eliminated and a simple rubber stop 135 may be substituted over post 128 of weld pin 68. The rubber stop 135 will improve the mechanical feel of the shifter by providing a rubber/metal contact defining the limits of travel of shift lever 21 and handle bracket 28 about first axis 25.

Figure 11:
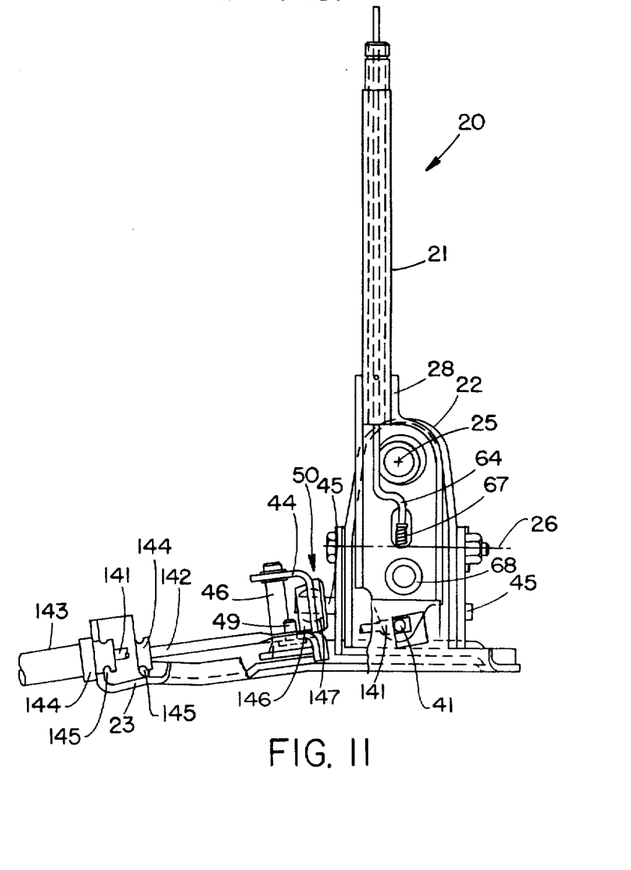
FIG. 11 is a side, elevational view of the shifter of the present invention.
Figure 12:
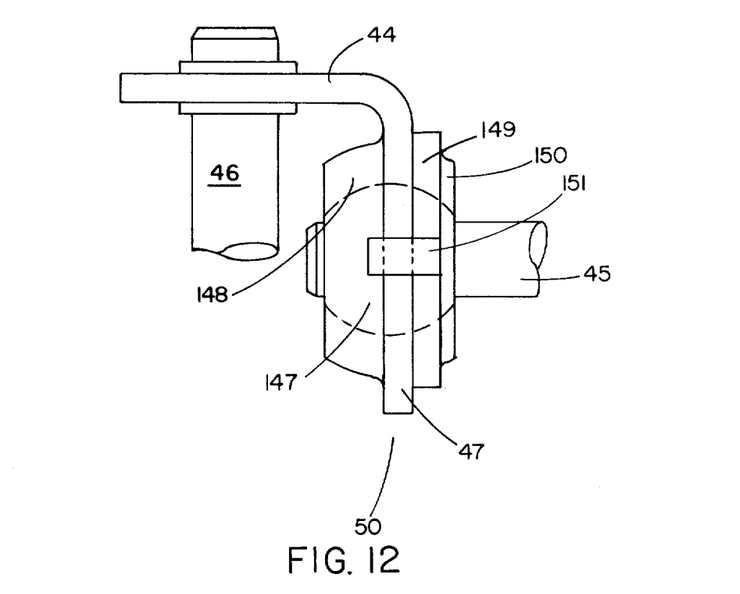
FIG. 12 is a plane view of a ball and socket connection employed in one embodiment of the invention.

Referring to FIGS. 11 and 12, details of means for accommodating incoming shielded cables at incident angles are illustrated. First and second shielded cables are illustrated at 141 and 142, respectively. The first and second cables 141 and 142 have shields 143 secured to the base plate 23 with circumferentially grooved retaining cups 144. The retaining cups 144 are inserted in apertures in base 23 and secured thereto by circlips or the like inserted in grooves 145. The means for accommodating incoming cables at angles incident to the first and second orthogonal axes comprises a bell crank 44 pivotable about a weld pin 46 that is generally orthogonal to the incident angle of cables 141 and 142. A ball and socket connection between the bell crank 44 and the drive pin 45 is provided at 50. The ball and socket connection is necessary to accommodate the pivoting of bell crank 44 about canted weld pin 46. In one embodiment of the invention, the ball and socket connection 50 comprises a urethane socket 146, which is pressed into an aperture in one end 47 of bell crank 44, and a Nylon ball 147, which is secured to one end of the drive pin 45.

Referring briefly to FIG. 12, in other embodiments of the invention, a ball and socket connection 50 may be provided with a Nylon or bronze ball 147 received in a metal pocket 148 stamped in the end 47 of bell crank 44. The Nylon ball 147 is secured in metal pocket 148 by a washer 149 including a cup portion 150 for engaging the back of ball 147. The washer 149 is secured to the end 47 of bell crank 44 by a plurality of deformable tabs such as the one illustrated at 151. The tab 151 is received in notches on end 47 of bell crank 44 and is bent therearound to secure the washer 149 to the face of end 47 of bell crank 44.

Figure 13:
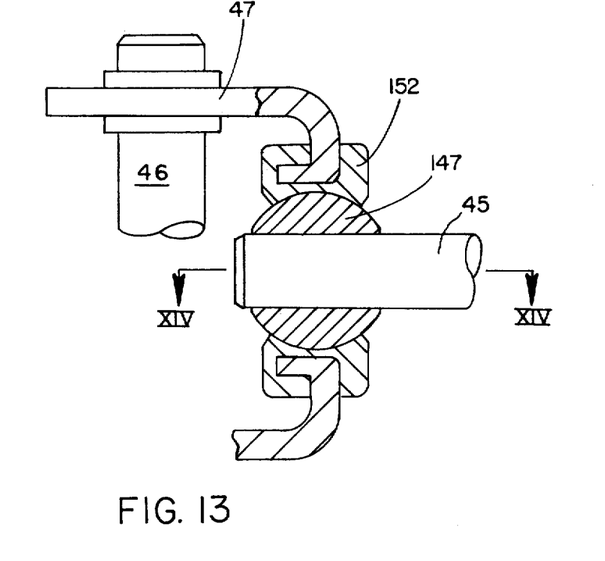
FIG. 13 is a plane view, partially in section of a ball and socket connection employed in one embodiment of the invention.
Figure 14:
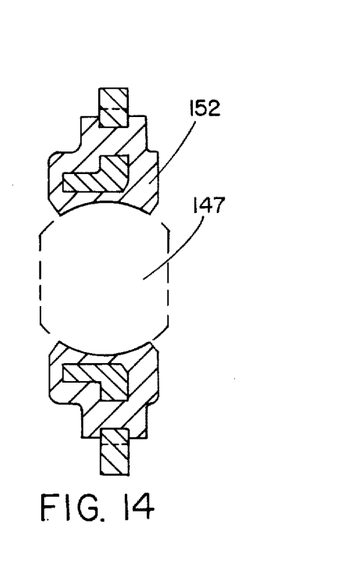
FIG. 14 is a sectional view of the ball and socket connection of FIG. 13 taken along line XIV—XIV.

Referring now briefly to FIGS. 13 and 14 in a preferred embodiment an injection molded ball and socket connection 50 may be provided. In this case a Nylon or bronze ball 147 is received in a socket 152 which is injection molded on the end 47 of bell crank 44. The socket 152 is preferably injection molded with Nylon having a 5% molybdenum disulphide and a 30% glass fill. The injection molded ball and socket connection is preferred since it minimizes lash or lost motion in the shifter.

Figure 15:
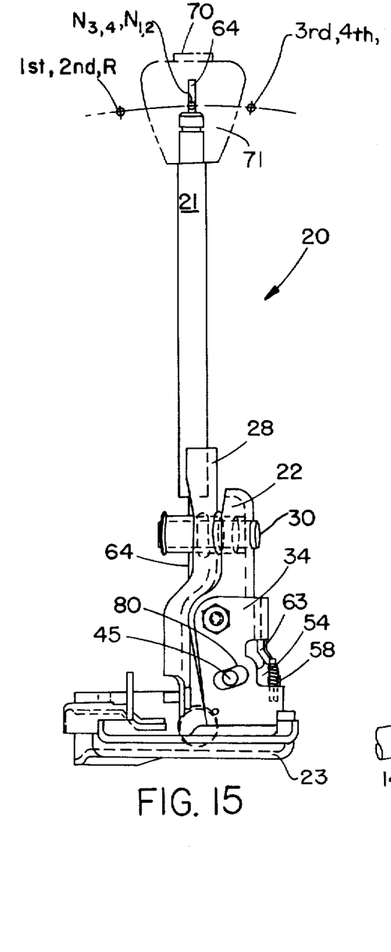
FIG. 15 is a rear elevational view of the shifter of the present invention.
Figures 16, 17:
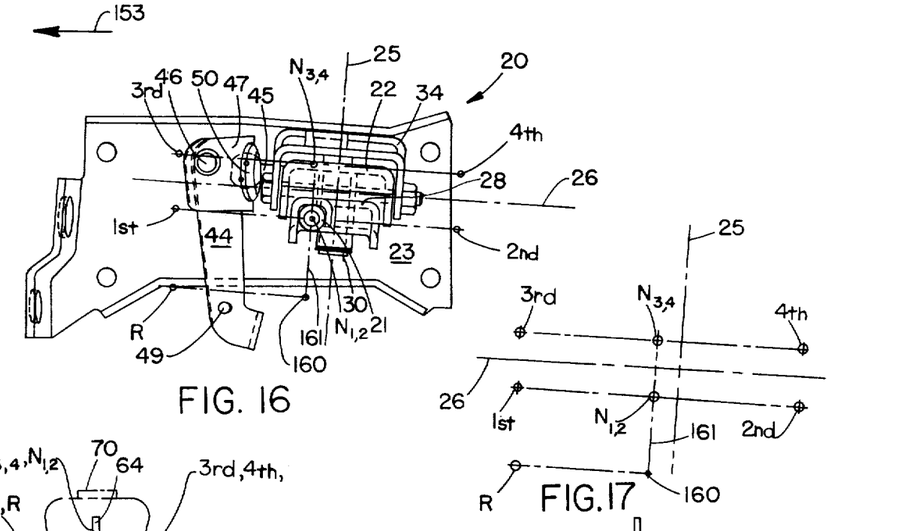
FIG. 16 is a top view of the shifter of the present invention.
FIG. 17 illustrates a gear shift pattern of one embodiment of the invention.

Referring now to FIGS. 11, 15, 16 and 17, the operation of the assembled shifter 20 will be described. In FIGS. 16 and 17 the arrow 153 indicates the forward direction of the vehicle. In FIGS. 11, 15 and 16, the top of the shifter 21 is illustrated in the neutral position $N_{1,2}$ between 1st and 2nd forward gears. To place the shifter in the 1st gear position, the operator pivots the shift lever 21 forward toward the 1st gear position. Pivoting of the shift lever 21 to the 1st gear position is accommodated by rotation of shift lever 21 and handle bracket 28 about first axis 25. Movement of the shift lever 21 toward the 1st gear position is translated into a displacement of first shielded cable 141 illustrated in FIG. 11 by virtue of the fact that first shielded cable 141 is pinned to handle bracket 28 at a point 41 spaced below first axis 25. Movement to the 2nd gear position is accomplished by pivoting of shift lever 21 about first axis 25 backward in the opposite direction. Again, this motion is translated into a displacement of first shielded cable 141 by virtue of the fact that first shielded cable 141 is pinned to handle bracket 28. In moving to the 3rd gear position, the operator pivots the shift lever 21 forward about first axis 25 until reaching the neutral position $N_{1,2}$ and then pivots the shift lever 21 to his right about second orthogonal axis 26 until reaching the neutral point $N_{3,4}$ for the 3rd and 4th forward gears. Then the shift lever is pivoted forward about first axis 25 until the 3rd gear position is reached. Again, pivoting of the shift lever 21 about the first axis 25 is translated into displacements of first shielded cable 141. Pivoting of the shift lever 21 about second orthogonal axis 26 is accommodated by pivoting of the carrier 22 with respect to the base 23 and tower 34. Pivoting of the carrier 22 is translated into a displacement of the second shielded cable 142 illustrated in FIG. 11 by bell crank 44. The carrier 22 is connected to one end 47 of bell crank 44 through drive pin 45 and ball connection 50. Pivoting of the carrier 22 about the second orthogonal axis 26 pivots bell crank 44 about pin 46 and displaces second shielded cable 141 pinned thereto at 49 accordingly. The transmission is shifted to the 4th gear position when the operator pivots the shift lever 21 about first axis 25 backward to the 4th gear position. Again, this motion is transmitted to a cable displacement of the first shielded cable by virtue of its being pinned to handle bracket 28.

Returning now to the neutral position $N_{1,2}$ between the 1st and 2nd forward gears, the operation of the reverse lockout follows. To position the transmission in the reverse gear, R, the operator depresses the button 70 atop handle 71, shown in phantom in FIG. 15, which in turn moves push rod 64 downward. Downward actuation of push rod 64 causes the bottom end of push rod 64 to engage a platform 66 on pawl 54 journaled on drive pin 45 of carrier 22. (Best illustrated in FIG. 9). Depression of push rod 64 pivots pawl 54 to register the leading edges 58 of pawl 54 with apertures 63 in the tower 34. Normally the leading edges 58 of pawl 54 prevent rotation of the shift lever 21 and carrier 22 to the operator's left about the second orthogonal axis 26 past the neutral point $N_{1,2}$. However, when leading edges 58 are registering with apertures 63 in the tower 34, the shift lever 21 may be freely rotated to the operator's left about second orthogonal axis 26 until interference between the drive pin 45 and the end of arcuate slot 80 occurs. This motion is transmitted to the second shielded cable via carrier 22, drive pin 45, and bell crank 44. At this point, the top of shift lever 21 is disposed at point 160 illustrated in FIG. 16. Full engagement in the reverse gear is then accomplished when the operator rotates the shift lever 21 forward about the first orthogonal axis 25 to the reverse gear position, R. This motion is transmitted to the transmission via the first shielded cable.

Referring specifically to FIG. 17, whenever the shift lever 21 is disposed along the line 161 interconnecting the neutral positions $N_{3,4}$ between 3rd and 4th forward gears and $N_{1,2}$ between 1st and 2nd forward gears, and the point 160, the undulating spring of the spring detent means (best illustrated in FIGS. 8 and 9) is compressed. However, movement about the first axis 25 either forward or backward from the line 161 releases the energy of the spring as the roller of the spring detent means seeks depressions in the undulating spring. These depressions in the undulating spring correspond to the position of the shift lever 21 at any one of the R, 1st, 2nd, 3rd or 4th gear positions. In this way, the mechanical feel of the shifter is greatly improved and rattling is eliminated. Positive stops for forward or backward pivoting of the shift lever 21 about the first axis 25 are provided by interference between the roller of the spring detent means and the flanges on carrier 22. Positive stops for rotation of shift lever 21 and carrier 22 about second orthogonal axis 26 are provided by engagement of drive pin 45 with the ends of arcuate slots 80 in tower 34, best illustrated in FIG. 13. When pivoting about the second axis to the operator's left, the reverse lockout pawl defines an initial stop at $N_{1,2}$. A second stop for pivoting about the second axis to the operator's left is provided at point 160 by interference between the drive pin 45 and the opposite ends of arcuate slots 80. These solid mechanical stops further improve the feel of the shifter.

It is understood that the shifter 21 cooperates with a manual transmission having a pair of transmission shift levers which translate the displacement of first and second cables 141 and 142 to transmission linkage movements engaging the desired gear as selected by movements of the shift lever 21.

The shifter of the present invention may be moved to almost any convenient location on an automotive vehicle and is impervious to flexing or twisting of the frame of the vehicle by virtue of the use of shielded cables to interconnect the shifter and the transmission. With minor modification to the layout of the shifter, cables extending to a rear mounted transmission may also be controlled with the shifter of the present invention. Yet this is provided in a compact "H" pattern shifter having simplified assembly, cost reduction, reliability and a solid mechanical feel.

The above description should be considered as exemplary and that of the preferred embodiment only. The true spirit and scope of the present invention should be determined by reference to the appended claims. It is desired to include within the appended claims all modifications that come within the proper scope of the invention.

The embodiments of the invention in which an exclusive property or privilege is claimed are defined as follows:

I claim:
1. In a shifter for operating a manual transmission with a pair of flexible cables comprising:
   a gear selecting shift lever;
   a pivotable shift lever carrier;
   first and second generally orthogonal axes;
   a stationary base for mounting the transmission shifter to an automotive vehicle;
   said shift lever being pivotable relative to said carrier about said first axis;
   said carrier being pivotable relative to said base about said second axis;
   means for translating rotation of said shift lever about said first axis to a cable displacement of one of said cables; and
   means for translating rotation of said shift lever and said carrier about said second axis to a cable displacement of said other of said cables the improvement comprising:
   said means for translating rotation of said shift lever and said carrier about said second axis to the cable displacement of said other cable comprises a member pivotably mounted on said base about an axis offset from said first and second axes;
   means for operatively connecting said carrier to said member; and
   means for securing the said other of said flexible cables to said member.

2. The shifter of claim 1 wherein said shift lever includes lockout means for locking said shift lever out of the reverse position.

3. The shifter of claim 1 further including means for accommodating flexible shielded cables at angles incident to said first and second orthogonal axes without bending of said cables in a manner that shortens cable life and effectiveness.

4. The shifter of claim 1 further including spring detent means for improving the feel of the shifter.

5. The shifter of claim 4 wherein said spring detent means comprises:
   an undulated wire spring secured to said carrier;

a follower disposed on said shift lever for following said undulated wire spring; and depressions in said undulated wire to accommodate said follower when said shift lever is in a fully engaged position.

6. The shifter of claim 5 wherein said follower comprises a roller journaled on said shift lever at a point below said first axis said roller including a circumferential groove for receiving said spring.

7. The shifter of claim 1 wherein said means for translating rotation of said shift lever about said first axis to a cable displacement comprises:

a stamped metal handle bracket, said handle bracket being secured to said shift lever and extending below said first axis; and means for pivotally securing a flexible shielded cable to said handle bracket below said first axis.

8. The shifter of claim 7 wherein said handle bracket further includes a post including a rubber bumper, and said carrier further includes a pair of opposing flanges, said post and said opposing flanges defining the limits of rotation of said shift lever about said first axis.

9. The shifter of claim 1 wherein said member is:

a bell crank pivotably mounted on said base;

means for connecting said carrier to one end of said bell crank; and means for pivotally securing a flexible shielded cable to the other end of said bell crank.

10. The shifter of claim 9 further including means for accommodating flexible shielded cables at angles incident to said first and second orthogonal axes without bending of said cables in a manner that shortens cable life and effectiveness.

11. The shifter of claim 1 wherein said base comprises a stamped metal base plate.

12. The shifter of claim 11 wherein said stamped metal base plate includes:

means for securing the shifter to an automotive vehicle body;

means for securing the shields of a pair of flexible shielded cables thereto; and a stamped metal tower secured thereto for receiving said carrier.

13. The shifter of claim 12 wherein said means for securing the shields of a pair of flexible shielded cables comprises:

an extended portion of said stamped metal base formed at an angle generally parallel to the incident angle of the incoming cables;

a flange disposed on the end of said extended portion, said flange extending in a direction generally orthogonal to the incident angle of the cables;

grooved circumferential retaining cups for receiving a circlip disposed on the shields of the cables; and apertures in said flange for securing said grooved circumferential retaining cups with a circlip.

14. The shifter of claim 1 wherein said carrier comprises a stamped metal part.

15. The shifter of claim 1 wherein said shifter controls a four forward speed manual transmission with an "H" pattern, movements of the shift lever along the vertical sides of the "H" pattern being accommodated by rotation of said shift lever about said first axis and displacement of a first flexible, shielded cable, movement of said shift lever horizontally on the "H" pattern between the sides of the "H" pattern being accommodated by rotation of said shift lever and said carrier about said second axis and displacement of a second flexible shielded cable.

16. The shifter of claim 1 wherein said shifter is floor mounted and controls the gear selection of a four speed forward mounted transmission on a front wheel drive automotive vehicle.

17. The shifter of claim 16 further including spring detent means for improving the feel of the shifter.

18. In a shifter for operating a manual transmission with flexible cables comprising:

a gear selecting shift lever;

a pivotable shift lever carrier;

first and second generally orthogonal axes;

a stationary base for mounting the transmission shifter to an automotive vehicle;

said shift lever being pivotable relative to said carrier about said first axis;

said carrier being pivotable relative to said base about said second axis;

means for translating rotation of said shift lever about said first axis to a cable displacement; and means for translating rotation of said shift lever and said carrier about said second axis to a cable displacement, the improvement comprising:

said means for translating rotation of said shift lever about said first axis to a cable displacement comprises:

a stamped metal handle bracket, said handle bracket being secured to said shift lever and extending below said first axis; and means for pivotally securing a flexible shielded cab to said handle bracket below said first axis;

said stamped metal handle bracket further including an aperture centered on said first axis;

a tube clinched in said aperture; and a pin received in said tube for pinning and pivotably mounting said stamped metal handle bracket to said carrier.

19. A shifter for operating a manual transmission with flexible cables comprising:

a gear selecting shift lever;

a pivotable shift lever carrier;

first and second generally orthogonal axes;

a stationary base for mounting the transmission shifter to an automotive vehicle;

said shift lever being pivotable relative to said carrier about said first axis;

said carrier being pivotable relative to said base about said second axis;

means for translating rotation of said shift lever about said first axis to a cable displacement; and means for translating rotation of said shift lever and said carrier about said second axis to a cable displacement, said means comprising a bell crank pivotably mounted on said base;

means for connecting said carrier to one end of said bell crank; and means for pivotally securing a flexible shielded cable to the other end of said bell crank; and means for accommodating flexible shielded cables at angles incident to said first and second orthogonal axes without bending of said cables comprising:

a drive pin secured to said carrier, said guide pin being roughly parallel to said second axis; and a ball and socket connection between said drive pin and said bell crank, whereby said bell crank may be pivoted on said base about a third axis canted with respect to said first and second orthogonal axes and generally orthogonal to the incident angle of a flexible shielded cable.

20. The shifter of claim 19 wherein said ball and socket connection includes a socket injection molded on said bell crank.

21. A shifter for operating a manual transmission with flexible cables comprising:
   a gear selecting shift lever;
   a pivotable shift lever carrier;
   first and second generally orthogonal axes;
   a stationary base for mounting the transmission shifter to an automotive vehicle;
   said shift lever being pivotable relative to said carrier about said first axis;
   said carrier being pivotable relative to said base about said second axis;
   means for translating rotation of said shift lever about said first axis to a cable displacement; and
   means for translating rotation of said shift lever and said carrier about said second axis to a cable displacement;
   said shift lever including lockout means for locking said shift lever out of the reverse position in which said lockout means comprises:
   a pawl pivotably mounted in said carrier, said pawl being spring biased to a position at which it interferes with said base preventing movement of said carrier and said shift lever to the reverse position;
   an aperture in said base; and
   pawl actuating means disposed on said shift lever for pivoting said pawl out of engagement with said base and into said aperture allowing movement of said carrier and said shift lever to the reverse position.

22. The shifter of claim 21 wherein said pawl further includes a stop for engaging said base and defining a limit of rotation for said pivotably mounted pawl.

23. The shifter of claim 21 wherein said pawl actuating means comprises:
   a push button disposed on top of said shift lever; and
   means interconnecting said push button and said pawl for pivoting said pawl when said push button is depressed.

24. The shifter of claim 23 wherein said means interconnecting said push button and said pawl comprises:
   a spring biased rod running the length of said shift lever, the upper said rod spring biasing said push button up, the lower end of said rod contacting said pawl; and
   a platform on said pawl for receiving the lower end of said rod, said platform being disposed on said pawl with respect to the pivot point such that downward displacement of said push button and said rod pivots said pawl out of engagement with said base.

25. A shifter for operating a manual transmission with flexible cables comprising:
   a gear selecting shift lever;
   a pivotable shift lever carrier;
   first and second generally orthogonal axes;
   a stationary base for mounting the transmission shifter to an automotive vehicle;
   said shift lever being pivotable relative to said carrier about said first axis;
   said carrier being pivotable relative to said base about said second axis;
   means for translating rotation of said shift lever about said first axis to a cable displacement; and
   means for translating rotation of said shift lever and said carrier about said second axis to a cable displacement comprising:
   a bell crank pivotably mounted on said base; and
   a drive pin secured to said carrier, said guide pin being roughly parallel to said second axis and said drive pin engaging one end of said bell crank.

26. The shifter of claim 25 further including reverse lockout pawl journaled on said drive pin.

27. The shifter of claim 25 wherein said drive pin extends through an arcuate slot in said base, the ends of said arcuate slot defining the limits of rotation of said carrier about said second axis.

28. An "H" pattern shifter for remotely operating a manual transmission with shielded flexible cables comprising:
   a gear selecting shift lever;
   a pivotable shift lever carrier;
   first and second generally orthogonal axes;
   a stationary base for mounting the transmission shifter to an automotive vehicle;
   said shift lever being pivotable relative to said carrier and about said first axis along the sides of the "H" pattern;
   said shift lever and said carrier being pivotable as a unit relative to said base and about said second axis to link the sides of the "H" pattern;
   means for operatively connecting a flexible shielded cable to the shift lever;
   a bell crank pivotably mounted on said base about an axis offset from said first and second axes, said carrier operatively engaging one end of said bell crank; and
   means for connecting a flexible shielded cable to the other end of said bell crank.

29. The shifter of claim 28 wherein said shift lever includes lockout means for locking said shift lever out of the reverse position.

30. The shifter of claim 28 further including means for accommodating flexible shielded cables at angle incident to said first and second orthogonal axes without bending of said cables in a manner that shortens cable life and effectiveness.

31. The shifter of claim 30 wherein said means for accommodating flexible shielded cables at angles incident to said first and second orthogonal axes comprises:
   a drive pin secured to said carrier, said guide pin being roughly parallel to said second axis; and
   a ball and socket connection between said drive pin and said bell crank, whereby said bell crank may be pivoted on said base about a third axis canted with respect to said first and second orthogonal axes and generally orthogonal to the incident angle of a flexible shielded cable.

32. The shifter of claim 31 wherein said ball and socket connection includes a socket injection molded on said bell crank.

33. The shifter of claim 28 wherein said base comprises a stamped metal base plate.

34. The shifter of claim 33 wherein said stamped metal base plate includes:
   means for securing the shifter to an automotive vehicle body;
   means for securing the shields of a pair of flexible shielded cables thereto; and
   a stamped metal tower secured thereto for receiving said carrier.

35. The shifter of claim 34 wherein said means for securing the shields of a pair of flexible shielded cables comprises:
- an extended portion of said stamped metal base extending in a direction generally parallel to the incident angle of the incoming cables;
- a flange disposed on the end of said extended portion, said flange extending in a direction generally orthogonal to the incident angle of the cables;
- grooved circumferential retaining cups for receiving a circlip disposed on the shields of the cables; and
- apertures in said flange for securing said grooved circumferential retaining cups with a circlip.

36. The shifter of claim 28 wherein said carrier comprises a stamped metal part.

37. The shifter of claim 28 further including a drive pin secured in said carrier, said drive pin being disposed roughly parallel to said second axis and said drive pin interconnecting said carrier and said bell crank.

38. The shifter of claim 37 further including a reverse lockout pawl journaled on said drive pin.

39. The shifter of claim 39 wherein said drive pin extends through an arcuate slot in said base, the ends of said arcuate slot defining the limits of rotation of said carrier about said second axis.

40. The shifter of claim 28 wherein said shifter is floor mounted and controls the gear selection of a four speed forward mounted transmission on a front wheel drive automotive vehicle.

41. An "H" pattern shifter for remotely operating a manual transmission with shielded flexible cables comprising:
- a gear selecting shift lever;
- a pivotable shift lever carrier;
- first and second generally orthogonal axes;
- a stationary base for mounting the transmission shifter to an automotive vehicle;
- said shift lever being pivotable relative to said carrier and about said first axis along the sides of the "H" pattern;
- said shift lever and said carrier being pivotable as a unit relative to said base and about said second axis to link the sides of the "H" pattern;
- means for connecting a flexible shielded cable to the shift lever below said first axis;
- a bell crank pivotably mounted on said base about an axis offset from said first and second axes, said carrier engaging one end of said bell crank; and
- means for connecting a flexible shielded cable to the other end of said bell crank; said shift lever including:
- a stamped metal handle bracket, said handle bracket being secured to said shift lever and extending below said first axis;
- an aperture disposed on said handle bracket and disposed on said first axis;
- a tube clinched in said aperture; and
- a pin received in said tube for pinning and pivotably mounting said handle bracket to said carrier.

42. The shifter of claim 41 wherein said handle bracket further includes a post including a rubber bumper, and said carrier further includes a pair of opposing flanges, said post and said opposing flanges defining the limits of rotation of said shift lever about said first axis.

43. An "H" pattern shifter for remotely operating a manual transmission with shielded flexible cables comprising:
- a gear selecting shift lever;
- a pivotable shift lever carrier;
- first and second generally orthogonal axes;
- a stationary base for mounting the transmission shifter to an automotive vehicle;
- said shift lever being pivotable relative to said carrier and about said first axis along the sides of the "H" pattern;
- said shift lever and said carrier being pivotable as a unit relative to said base and about said second axis to link the sides of the "H" pattern;
- means for connecting a flexible shielded cable to the shift lever below said first axis;
- a bell crank pivotably mounted on said base about an axis offset from said first and second axes, said carrier engaging one end of said bell crank; and
- means for connecting a flexible shielded cable to the other end of said bell crank;
- said shift lever including lockout means for locking said shift lever out of reverse position, said lockout means comprising:
- a pawl pivotably mounted in said carrier, said pawl being spring biased to a position at which it interfers with said base preventing movement of said carrier and said shift lever to the reverse position;
- an aperture in said base; and
- pawl actuating means disposed on said shift lever for pivoting said pawl out of engagement with said base and into said aperture allowing movement of said carrier and said shift lever to the reverse position.

44. The shifter of claim 43 wherein said pawl further includes a stop for engaging said base and defining a limit of rotation for said pivotably mounted pawl.

45. The shifter of claim 43 wherein said pawl actuating means comprises:
- a push button disposed on top of said shift lever; and
- means interconnecting said push button and said pawl for pivoting said pawl when said push button is depressed.

46. The shifter of claim 45 wherein said means interconnecting said push button and said pawl comprises:
- a spring biased rod running the length of said shift lever, the upper said rod spring biasing said push button up, the lower end of said rod contacting said pawl; and
- a platform on said pawl for receiving the lower end of said rod, said platform being disposed on said pawl with respect to the pivot point such that downward displacement of said push button and said rod pivots said pawl out of engagement with said base.

47. A floor mounted shifter for controlling with flexible cables the gear selection of a four speed forward mounted manual transmission on a front wheel drive of an automotive vehicle comprising:
- a gear selecting shift lever;
- a pivotable shift lever carrier;
- first and second generally orthogonal axes;
- a stationary base for mounting the transmission shifter to an automotive vehicle;
- said shift lever being pivotable relative to said carrier about said first axis;
- said carrier being pivotable relative to said base about said second axis;
- means for translating rotation of said shift lever about said first axis to a cable displacement; and
- means for translating rotation of said shift lever and said carrier about said second axis to a cable displacement; and a spring detent means for improving the feel of the shifter including:

an undulated wire spring secured to said carrier;

a wire guided roller disposed on said shift lever for following said undulated wire spring; and depressions in said undulated wire to accommodate said roller when said shift lever is in a fully engaged position.

48. In a shifter for operating a manual transmission with a pair of flexible cables comprising:

a gear selecting shift lever;

a pivotable shift lever carrier;

first and second generally orthogona axes;

a stationary base for mounting the transmission shifter to an automotive vehicle;

said shift lever being pivotable relative to said carrier about said first axis;

said carrier being pivotable relative to said base about said second axis;

first means for translating rotation of said shift lever about said first axis to a cable displacement of one of said cables; and second means for translating rotation of said shift lever and said carrier about said second axis to a cable displacement of said other of said cables the improvement comprising:

said pair of flexible cables including one cable being connected to said first means and the other cable of said pair being connected to said second means, said cables being arranged substantially parallel to each other and extending in substantially straight lines from their connections to said first and second means for at least a portion of their length;

said cable connected to the first means including a pivotal connection to said shift lever; and said means for translating rotation of such shift lever and said carrier to the displacement of said other cable comprising a member pivotally mounted on said base about an axis offset from said first and second axis with means for operatively connecting said carrier to said member whereby movement of said carrier is translated to pivotal movement of said member; and means for securing the said other of said flexible cables to said member whereby the movement of said carrier translated to said member is thereby translated to said cable along the straight line along which the said other cable extends.

49. The shifter of claim 48 wherein said member is a bell crank pivotally mounted on said base; means for connecting said carrier to one end of said bell crank; and means for pivotally securing the other cable to the other end of said bell crank.

50. The shifter of claim 48 in which the means for connecting the carrier to the said one end of said member is a universal connection wherein any binding is eliminated.

* * * * *